United States Patent [19]

Cooper

[11] Patent Number: 5,875,211
[45] Date of Patent: Feb. 23, 1999

[54] MULTISITE RADIO SYSTEM WITH FALSE MOBILE RADIO SIGNALLING DETECTION

[75] Inventor: Gerald M. Cooper, Gretna, Va.

[73] Assignees: Ericsson Inc.; Research Triangle Park, both of N.C.

[21] Appl. No.: 548,828

[22] Filed: Oct. 26, 1995

[51] Int. Cl.⁶ .................................................. H04B 17/02
[52] U.S. Cl. ........................................................ 375/213
[58] Field of Search ........................... 375/213; 371/37.7, 371/2.1, 20.2; 380/25, 30, 43, 44; 379/58, 59; 455/7, 33.1

[56] References Cited

U.S. PATENT DOCUMENTS

| | | |
|---|---|---|
| 4,903,321 | 2/1990 | Hall et al. . |
| 4,905,302 | 2/1990 | Childress et al. . |
| 5,068,916 | 11/1991 | Harrison et al. ..................... 375/356 X |
| 5,142,539 | 8/1992 | Dahlin . |
| 5,200,954 | 4/1993 | Teel, Jr. et al. . |
| 5,212,724 | 5/1993 | Nazarenko et al. . |
| 5,230,003 | 7/1993 | Dent . |
| 5,355,412 | 10/1994 | Kangas ....................................... 380/23 |
| 5,390,197 | 2/1995 | MacDonald et al. ................... 371/37.1 |

FOREIGN PATENT DOCUMENTS

WO 94/14287  6/1994  WIPO .

OTHER PUBLICATIONS

Air Interface of the Future European Fully Digital Trunk Radio System, *Institute of Electrical and Electronics Engineers*, pp. 714–717, No. 43, May 18, 1993.

*Primary Examiner*—Stephen Chin
*Assistant Examiner*—Mohammad Ghayour
*Attorney, Agent, or Firm*—Nixon & Vanderhye P.C.

[57] ABSTRACT

In a digitally trunked radio repeating system that may include several radio site repeating transceivers, a site area identification coding system to ensure that transmissions intended for one site or as one mode are not decoded by another site or as another transmission mode. In particular, a site or transmission mode identification byte is used in the transmission error coding (CRC) scheme applied by both a mobile transceiver and the radio site repeater. Since the identification byte is used in the transmitter to calculate the CRC error correction data, the same identification byte must be used in the receiver to decode the CRC value. The intended radio site or transmission mode wilt apply the proper identification byte to decode a transmission. The wrong radio site or mode will not correctly decode the CRC value in a transmission because the wrong identification byte will be applied to the transmission. Accordingly, a transmission received by the wrong radio site or at a transceiver operating in a mode different that the transmission will not properly decode the transmission due to a CRC error caused by applying the wrong identification byte.

8 Claims, 3 Drawing Sheets

MULTISITE RADIO SYSTEM WITH FALSE MOBILE RADIO SIGNALLING DETECTION

FIELD OF THE INVENTION

This invention relates to trunked radio frequency (RF) communications, and more particularly, to trunked RF communications systems where mobile radios may freely roam between trunked RF communication sites over a wide area that encompasses plural multisite switch networks.

BACKGROUND OF THE INVENTION

The invention relates to a multisite network of several single radio frequency (RF) broadcast site systems. Digital trunked radio transceivers capable of handling communications between numerous mobile units and dispatcher consoles in a single geographic area are known. Trunked RF repeater systems are used, for example, by public service organizations, such as police, fire and rescue departments, taxi services and commercial delivery fleets. These RF repeater systems permit a relatively-limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trucking" (time-sharing) of the limited number of RF channels among a large number of users. A multisite switch links several individual RF broadcast site trunked systems to form a wide-area network in which radio users in one site area can communicate with users in another site area.

The sharing of a limited number of radio channels between individual sites in a multisite networks gives rise to problems that occur when transmissions from one site are received and misinterpreted by a receiver in another site. For example, a transmission from a mobile radio unit in one site area and intended for the repeating base station in that site may be inadvertently received by the repeating station at an adjacent site. While the adjacent site should not receive or act on a transmission from a mobile unit in another site, on rare occasions adjacent sites have improperly interpreted such remote transmissions as legitimate transmissions from their own site area. When a site repeating station acts on a transmission from another site, the repeating station may, for example, incorrectly interpret the transmission as an emergency message from its site area and pass the emergency message to a dispatcher console. The dispatcher sees an emergency message for which there is no emergency or even a corresponding mobile unit in the site area from which the erroneous message originated. Depending on the content of the message, e.g., a mobile unit emergency, the dispatcher may act on the message and commit resources, such as police or rescue units, to a particular site location, even though there is no actual reason to commit those resources.

Similarly, a transmission processed by the wrong site repeating station may cause the station to incorrectly log the mobile unit as having entered its site area when the mobile unit is still in its original site area. In addition to transmissions from one site being wrongly processed in another site, similar problems arise when transmissions are incorrectly received on wrong channels in their own site. Such wrong channel reception can arise from interference and intermodulation of channel frequencies being transmitted from a single site.

Briefly, each digitally-trunked RF communications site base station includes a "control" RF channel and multiple "working" RF channels. The working channels are used to carry actual communications traffic, e.g., analog FM, digitized voice, digital data, etc. The RF control channel is used to carry digital control signals between the repeater sites and user RF transceivers (radio units) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message. Assuming a working channel is available, the repeater site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange. The control channel is thereafter not used during the communication. Accordingly, the control channel is used to request and assign working channels, and to transmit certain emergency messages.

When the communication terminates, the transceivers "release" the temporarily assigned working channel and return to monitoring the RF control channel. The working channel is available for reassignment to the same or different user transceivers via further messages conveyed over the RF control channel. An exemplary "single site" trunked RF repeater system is disclosed in commonly-assigned U.S. Pat. Nos. 4,905,302 and 4,903,321, which are incorporated by reference.

Single site trunked RF repeater systems may have an effective coverage area of tens of square miles (if the area is free of obstructions) or only a few city blocks (if large buildings obstruct the broadcast coverage of the site and mobile radio units). A single site may include one or more satellite receiving stations, e.g., repeating stations, and a single high power transmitting site if a somewhat larger coverage area is desired. However, the coverage of a single site is often inadequate to reach the broadcast area of some governmental entities and other public service trunking system users that require an RF communications coverage area of hundreds of square miles or of an entire city. To provide large coverage areas, it is necessary to provide multiple RF repeater sites and to automatically coordinate all sites so that a radio transceiver located anywhere in the system coverage area may efficiently communicate in a trunked manner with other radio transceivers located anywhere in the system coverage area.

The control channel of a site may be used when mobile radio units leave one site area and enter an adjacent site area. As a mobile unit roams from one site to another, the mobile radio's reception of the control channel in the first site weakens to such an extent that the radio automatically scans for a second site's control channel. When the control channel for the second site is received, the radio unit sends a log-in message to the second site repeater which logs the new unit into its site and advises the first site, via a multisite network switch, that the unit is to be logged off the first site.

FIG. 1 is a schematic diagram of a simplified exemplary multiple-site trunked radio repeater system, e.g., a multisite system, having three radio repeater (transmitting/receiving) sites S1, S2, and S3 providing RF communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site typically has a site controller (e.g., a digital computer) that acts as a central point for communications in the site, and is capable of functioning relatively autonomously if all participants of a call are located within its associated coverage area.

To enable communications from one area to another a switching network, a "multisite switch" may be provided to establish audio and control signal pathways between repeaters of different sites. These pathways are set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the audio channel assigned to the call. This assigned working channel is applicable only within the area covered by that site and is used as a communication channel only for mobile units within the site. Nevertheless, a transmission 110 from a mobile unit in one site may inadvertently be received by a repeater transceiver in a second site, causing the second site to act on the transmission as if it were a transmission from within the site area. The subject of this invention is to avoid having a repeater radio site controller act on a signal from another site unintentionally received by the radio.

In a multisite radio system, when a site controller assigns a working channel for a mobile unit in its site area, the site controller also sends a channel request message to multisite switch (200). The multisite switch also sends the channel request to other site controllers having a designated callee within their site area. Audio signals are routed through the multisite switch such that audio pathways are created to serve one or more callees and one or more dispatcher consoles 202 involved in the communication. Upon receiving a channel request, these "secondary" site controllers (in the sense they did not originate the call) assign an RF working channel to the call for each respective site. Each secondary working channel is operative only in the site area covered by the secondary site controller. The secondary site controller(s) also sends the channel assignment back up to the multisite switch.

A caller can communicate with a radio unit or group of radio units in another area via the multisite switch. The call is initially transmitted to the primary site repeater, routed through an assigned audio slot in the multisite switch to secondary site repeaters, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

The multisite switch preferably includes a distributed control architecture. The logical functions and computational workload of the multisite switch are shared by various distributed microprocessor "nodes". Each node is connected either to a site controller 102, dispatch console 202, public and/or private landline telephone exchanges and other components of the particular communications system. Most nodes function as switch interfaces and include, for example, Master Interface Modules (MIMs) for nodes coupled to site controllers and Console Interface Modules (CIMs) for nodes coupled to dispatch consoles. Each interface module is supported by a controller card that utilizes several microprocessors. All of the cards have substantially the same hardware and are interchangeable. Each card acts as a gateway interface into the distributed control switch network. Detailed description and operation of such a distributed multi-site switch is set forth in commonly assigned U.S. Pat. No. 5,200,954 to Teel, Jr. et al which is also incorporated herein by reference.

In addition, two or more multisite switches may be linked to form a wide-area multisite system having a relatively-large wide-area covered by a single RF trunked system. As the number of sites in a multisite (or wide area) network increases, the amount of sharing increases of the limited number of channels assigned to that system. While it is preferable that a multisite network not have two sites with overlapping broadcast areas that share the same channel frequencies, such sharing of channel frequencies between adjacent sites may occur. Similarly, a mobile unit assigned to one site may, in certain circumstances (such as when transmitting from a hill on the edge of a site area and in optimum transmission weather conditions) transmit a message that is received by another site that is normally out of range of radio units in that site. Accordingly, there has been a long-felt problem associated with transmissions in one site area being received by a site repeater in another site.

To avoid having transmissions 110 inadvertently received by unintended sites, the site repeating radios were previously geographically isolated to minimize overlapping radio coverage between the sites. Because of graphic isolation, a transmission from one site would not be received on the control channel of another site. Isolation of sites is not always geographically practical as some overlap in radio broadcast coverage almost always occurs in a multisite system. Similarly, another conventional method to avoid having a site repeater radio act on a transmission from another site was to modify the transmission protocols used by the mobile units. Adding site identification information to the transmission protocols usually increases the signalling overhead associated with the transmission (and thereby reduces the available time for transmission of voice or other information) and requires relatively extensive modification of the messaging protocols used by the radios in a multisite network. In addition, most of the site identification protocols increase the difficulty in adapting a message protocol that allows a mobile site to roam from site to site. Moreover, intermodulation of transmissions can generate signals received on another channel in the same site station that can cause problems of transmissions being received and processed on the wrong channel.

SUMMARY OF INVENTION

The present invention solves the problem of a transmission being inadvertently received and processed by an untended site on an unintended channel by modifying the error detection and correction coding (error coding) already existing in a transmission protocol. The modified error coding is unique (at least with respect to adjacent or nearby sites) to the site to which a mobile unit is presently associated or the transmission mode, e.g., date or voice. This modification to the error coding causes each transmission from a mobile RF unit to have information that associates the transmission with the intended site or transmission mode. For example, a site controller when decoding the error detection codes in a transmission received from a mobile unit within the controller's site area will properly decode the transmission. However, if a remote transmission from another site is received by the site controller, that remote transmission will have its error coding set for another site and the site controller will interpret the transmission has having an uncorrectable error and discard the transmission.

By placing site identification information in the error coding of a transmission, no new protocols or protocol modification are needed at the site controller. The protocol for discarding transmissions with errors in the error coding already exists on the site controller and similar error correction coding exists in mobile units. While the existing error coding is used to discard corrupted transmissions, this same error coding is used in the present invention as a means for inserting a site identification information into a transmission.

Similarly, the present invention may be used to distinguish the mode of transmission, e.g., data or voice, by setting an identifier in the error correction coding for each mode of transmission. For example, a particular bit setting in a byte used to calculate an error correction value may signify a data transmission and another bit setting may signify a control message or voice transmission. Identifying the mode of transmission reduces the likelihood of a transmission being received on another channel, such as through interference or intermodulation, and being wrongly interpreted on that other channel. For example, a digital data message on a working channel if received on a control channel may be wrongly decoded as an emergency message.

In an embodiment of the present invention, a single bit is set of a previously-unused and untransmitted byte in the group of bytes used to calculate an error correction (CRC— cyclic redundancy check code) value for a transmission from a mobile RF transceiver unit. This bit setting is unique to a particular site in a multisite network and/or the type of transmission, e.g. control, data or voice. The mobile units in a site area and the site repeater stator all store the bit setting. The bit setting of the "site identification byte" with the transmitted bytes are used to calculate the CRC value, and the result, e.g., remainder, of that calculation is added as the CRC value to a digital transmission from the mobile unit.

At the receiver, the CRC value is recalculated using the received transmission of the transmitted bytes and the site identification bit setting that is also stored in the receiver. The CRC value is calculated on the bytes received in the transmission (e.g., five bytes) and a non-transmitted byte (the sixth byte). This non-transmitted byte is the site mode identification byte having a bit setting that is unique (at least relative to nearby sites) to that site. This bit setting for the non-transmitted byte is also stored in temporary memory, e.g., RAM, while the mobile units are logged into that site. The CRC value result of that recalculation is compared to the CRC value included in the transmission to determine whether the received transmission is uncorrupted. Since the non-transmitted byte's bit settings are used to calculate the CRC value in both the transmitter and receiver, the receiver must apply the same bit setting for the non-transmitted byte as was applied by the transmitter to calculate the same CRC value as is appended to the transmission. Accordingly, if the receiver applies a different bit setting for the non-transmitted byte that was applied by the transmitter, the CRC value calculated by the receiver will not match that appended to the transmitter, and the receiver will discard the transmission as being corrupted.

Each site repeater radio regularly broadcasts an identification message over its control channel that designates the proper bit setting in the identification byte in the CRC code. As a mobile unit enters a new site area, its radio will scan for another working channel and when found will wait until it receives the site identification signal or times out. Upon receiving the site identification signal, the mobile transceiver sets the proper bit of the identification byte for future transmissions and sends a log-in message (with proper bit identification) to the new site repeater radio. When a mobile unit logs into a new site, the site controller logs the radio into its site and sends a log-off message over the multisite switch to the mobile radio's former site.

Thereafter, the mobile unit sets the appropriate bit(s) in the site identification byte of the error correction coding as instructed from the site controller. If a transmission from that mobile unit is received at another site, the other site controller detects an error when it compares the received CRC value to the value calculated from the received transmission and discards the transmission as being in error. Only the intended site controller to which the mobile unit is logged will properly decode the transmission as being error free because the bit setting of the identification byte in the error correction coding is set for only that site controller. In this manner, transmissions from a mobile unit in other sites will not be misinterpreted by a site controller and thus erroneous messages are minimized and mobile units are not incorrectly logged into sites in which they are not present.

BRIEF DESCRIPTION OF THE DRAWINGS

The objectives, advantages and features of the invention will become more apparent from the following description that includes the accompanying drawings and detailed written description. In the drawings.

DETAILED DESCRIPTION OF THE DRAWINGS

Figure 1:
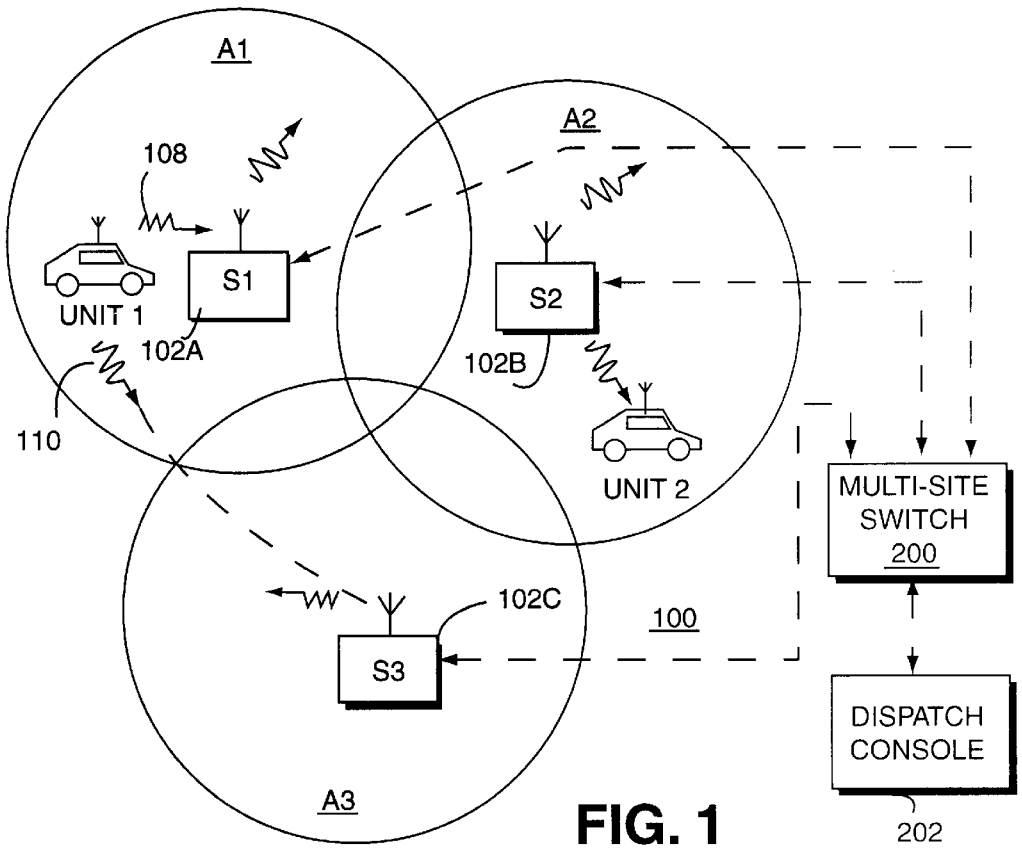
FIG. 1 is a diagram illustrating an exemplary three site multi-site network, which may embody the present invention.

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

An exemplary trunked radio repeater system 100 in accordance with the invention is generally depicted and was described above in conjunction with in FIG. 1. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller via an "inbound" digital control message transmitted over its assigned RF control channel that an audio working channel is needed. The site controller assigns a working channel to the call and instructs the caller's radio unit to switch from the control channel to the assigned working channel.

This assigned working channel is ready to support communications within the area covered by the site. The transmissions may be of voice, data or control message information. Generally transmissions 108 from a mobile unit, e.g., UNIT 1, are received by its local site repeater 102A. However, a transmission 108 from a mobile unit or even from a site repeater 102A that rebroadcasts some mobile unit transmissions and dispatcher transmissions may be received by another site repeater/controller, e.g., 102C. If that errant transmission is received on the working channel of the other site repeater/controller, then the transmission may be incorrectly interpreted by that site controller as a control message, e.g., an emergency message or log-in message. Similarly, a transmission(s) on one channel from a site may be received on another channel at that site by way of interference or intermodulation. Such interference and intermodulation usually arises only when two or more repeater transceivers are located closely together and a transmission from one transceiver bleeds over to another transceiver.

In addition, the site controller sends a message indicating the working channel assignment to multisite switch 200. The switch, in turn, sends a channel request to all other site controllers and routes audio signals such that an audio signal pathway is created between the RF site repeater servicing the caller and the RF site repeater(s) servicing the callee(s). Additional audio signal pathways may also be established in similar fashion such that one or more dispatch consoles 202 may become involved in the communication. Upon receiving a channel request message, these "secondary" site controllers may each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site S1 to active transmitters of each of the other sites participating in the call.

Figure 2:
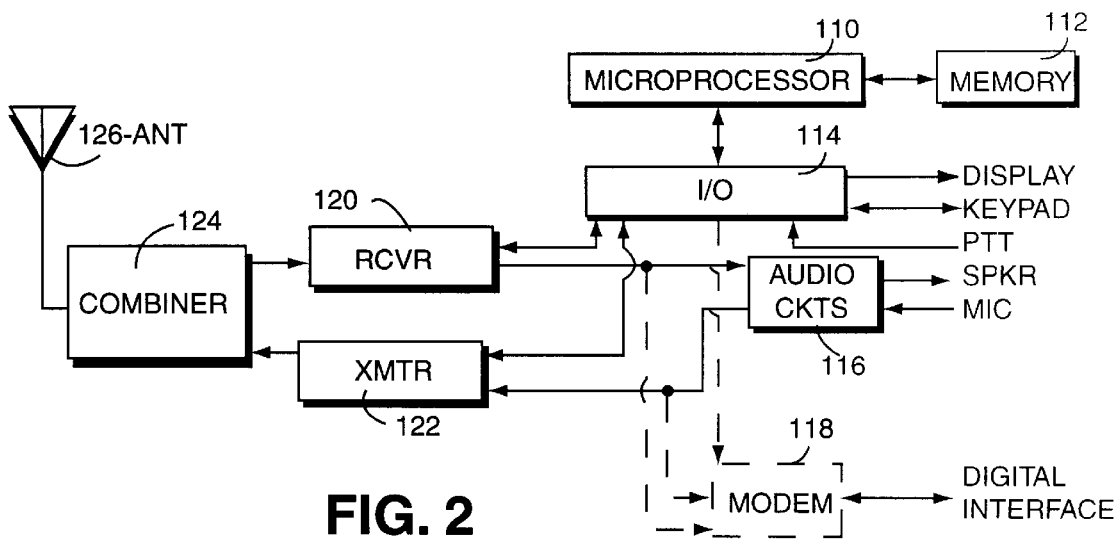
FIG. 2 is a block diagram of an exemplarly mobile unit shown in FIG. 1.

FIG. 2 shows the general architecture of a suitable mobile/portable radio unit for use within the extended trunk radio communication's network within accordance with the present invention is now described in conjunction with 2. Microprocessor 111 is provided with suitable memory 112 and input/output circuits 114 so as to interface with the radio unit display, keypad, push-to-talk (PTT) switch as well as audio circuits 116 which provide basic analog audio outputs to the speaker and accept audio inputs from the microphone. Auxiliary control over a modem 118 as a digital interface (e.g. to voice encryption, vehicle location, or other types of digital communication sub-systems) may also be provided if desired. Of course, the I/O circuits 114 also permit suitable programmed control over RF receiver 120 and transmitter 122 which, via conventional signal combiner 124, permit two-way, fully duplex communication over a common antenna 126 as will be appreciated by those skilled in the art.

Figure 3:
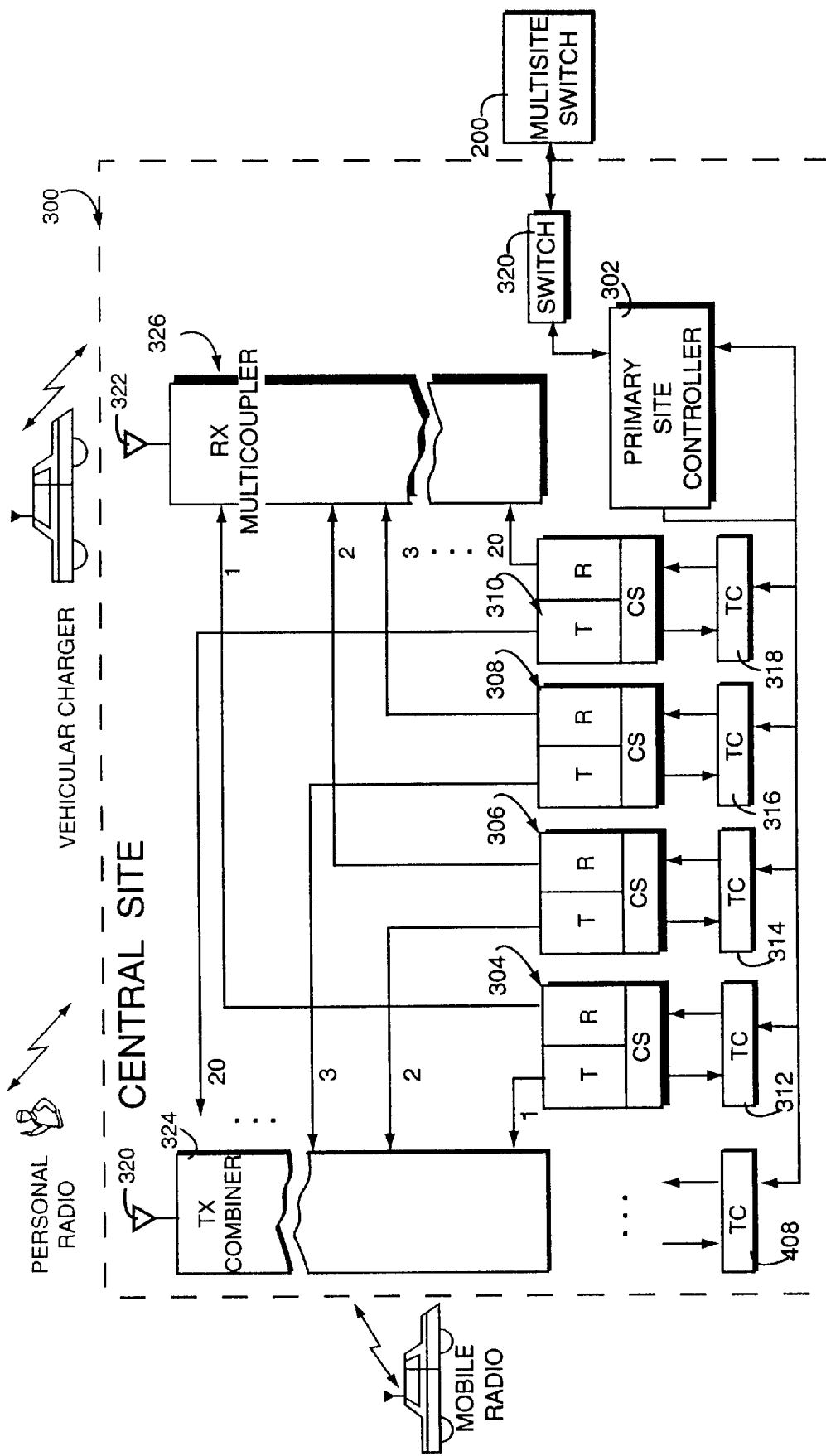
FIG. 3 is a block of an exemplarly site controller, e.g., 102A, shown in FIG. 1.

FIG. 3 shows an exemplary general architecture of a suitable radio repeater site 300, e.g., a site S1 102A in FIG. 1, having one or more repeating transceivers and a site controller for use within the extended trunk radio communication's network. A radio repeater site 300 includes a site controller 302, and individual repeater channel transceivers 304, 306, 308, 310. Each transceiver includes circuitry for RF transmission (T), and reception (R), which are both connected to a control shelf (CS) microprocessor based controller. The site controller 302 is preferably a digital computer that oversees the general operation of the repeater site 300 and communciates with the multisite switch 200. In particular, the site controller 302 controls the repeater site by sending and receiveing digital signals to and from trunking cards (TC) 312, 314, 316 and 318, where each trunking card is operatively connected to the control shelf processors of each of the individual channel transceiver 304–310.

The trunking cards have different modes of operation corresponding to the type of transmission that they cards are carrying. For example, the trunking cards have a data mode to support data transmissions, a control channel mode with the channel supported by the TC is assigned to be the control channel, and a voice mode to support voice transmissions. A switch trunking card 320 allows the site controller 302 to communicate with the multisite switch 200. A transmitting antenna 320 and a receiving antenna 322 (which may be a common antenna structure) are utilized with a conventional combining/decombining circuits 324, 326 to connect the transmitters (T) and receivers (R) of the transceivers 304 to 310 to the antenna structures 320, 322. A more detailed description of an exemplary repeater site 300 is contained in commonly-owned U.S. Pat. No. 5,212,724, which is incorporated by reference.

Figure 4:
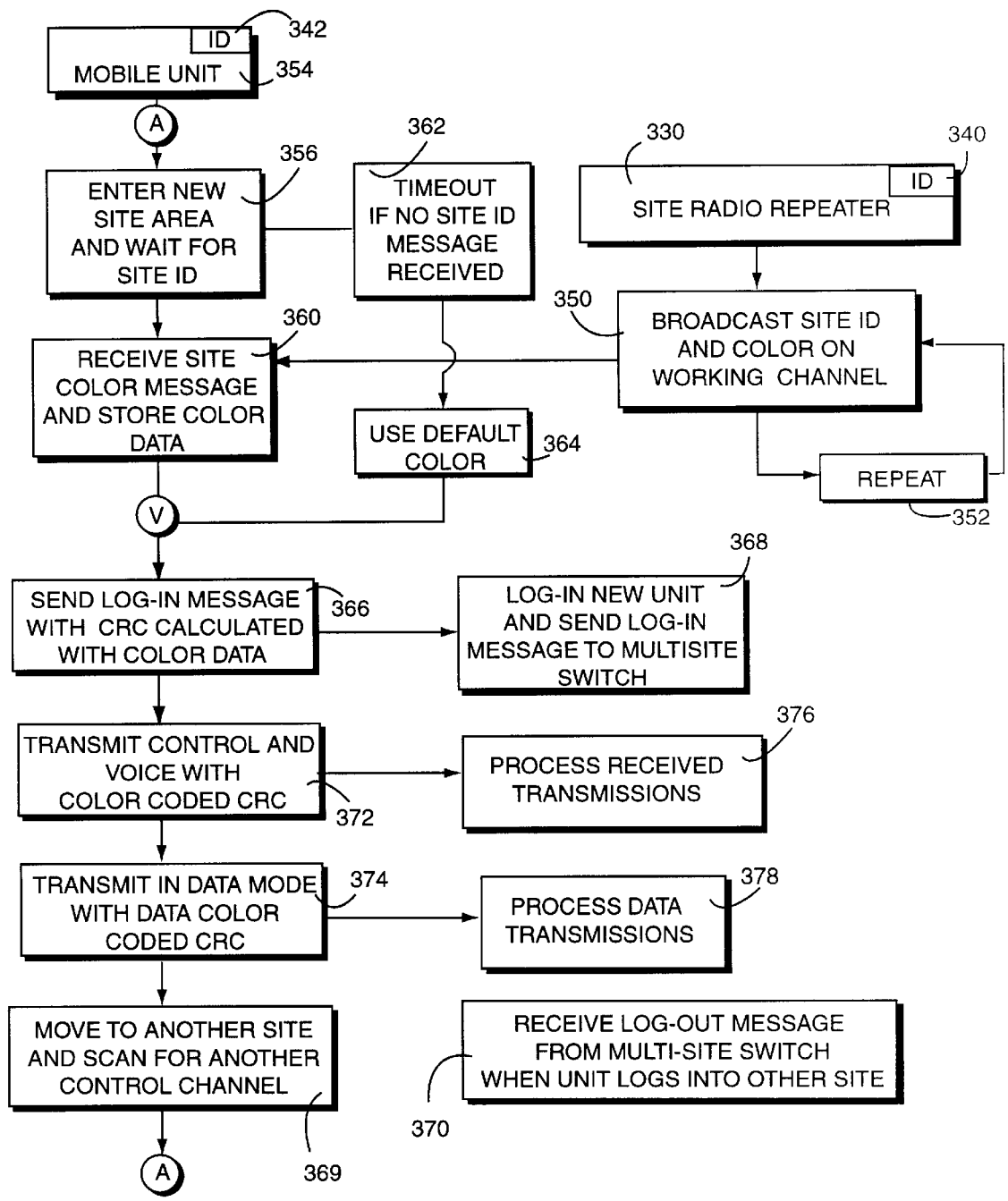
FIG. 4 is a flow chart showing the error correction instructions executed by the site controller and mobile unit.

FIG. 4 shows a state diagram for executable instructions by a processore in the site controller and by a mobile radio unit. A site radio repeater 330 stores an identifier site ID 340 which may be a particular bit setting or group of bit settings for one or more ID bytes that are unique to that site, at least with respect to adjacent and nearby sites. This site ID may be set when the site radio repeater is initially set up or reconfigured, or the site ID may be downloaded from a central system manager through the multisite switch 200. In step 350, The site ID may be (step 352) included as part of a regularly-transmitted site identification message on the control channel of the site. The site ID may be included in a message that identifies the "color" of the site (where the color is the site identification information), and includes other information regarding the personality of the site, such as information sufficient to identify the control and working channels of the site, and other site settings. The site identification message is intended for new mobile radio units 354 that have left an adjacent site area and entered a new site area, step 356. As the mobile radio unit looses reception of the control channel of the first site repeater, the radio scans for another control channel of an adjacent site.

Once the mobile radio unit 354 captures a new control channel frequency, the unit waits to receive a site identification message (see step 356) regularly broadcast from the new site radio repeater 330 in step 350. When a site identification message is received in step 360, the mobile radio unit 354 decodes the message and extracts certain "personality" data and the site ID byte bit setting that identifies the site radio repeater 330. This site ID byte is stored in memory 342 of the mobile radio unit 354. If no site identification message is received within a predetermined time period (step 362), the mobile unit 354 sets the site ID byte bit setting to a default setting common to all site radio repeaters in the applicable mulitsite network (step 364).

Any site radio repeater (or only those repeaters set to decode transmissions having a default identification bit setting) may receive and properly decode a transmission in which the error correction (CRC) code was calculated using a default setting. However, with the default site ID byte setting, there is a potential that the site radio repeater will receive and decode a transmission from a remote mobile unit that is not in the site area. This problem does not occur when the error correction code is calculated using the site ID bit setting, colloquially referred to as a "color code", that is unique to the site to which the mobile unit is currently logged.

After the mobile unit 354 receives the site identification message in step 360 (or switches to a default bit setting for the site identification in step 364), the mobile radio unit updates its data memory to store the new site ID byte bit setting 342 applicable for the new site, and the unit 354 sends a log-in message to the site radio repeater 358 on the control channel in step 366. The log-in message, as do nearly all transmissions from the mobile unit, includes a error correction byte (CRC value) that is calculated using the site identification bit setting and data to be transmitted, as is more fully described below. The log-in message identifies the moible radio unit 354 and is conveyed by the site radio repeater 358 to the multisite switch 200, in step 368.

The multisite switch 200 retains a map(s) of the mobile units as they are logged into each site area. When a mobile unit, e.g. UNIT 1, sends a log-in message that is passed by a first site to the multisite switch, the switch notes on its site map(s) for the first site that UNIT 1 is logged in and removes UNIT 1 from a second site in which the UNIT 1 had been previously logged. Accordingly, the multisite switch monitors the location of each mobile unit by updating its site maps with log-in messages transmitted by mobile units as they enter a new site area. The multisite switch sends a logged-out message to the second site radio repeater so that repeater can update its data memory and note that UNIT 1 has left its site area (step 369), in step 370.

After steps 366 and 368, when the mobile unit is logged in by the site radio repeater and multisite switch, the mobile unit 354 is ready to tranmit to and receive message from the site radio repeater 330. Each transmission from the mobile unit is in digital form and conforms to a predetermined protocol which includes, amoung other things, an error correction (CRC) value. For example, a standard error correction code, such as CRC, may be calculated from a series of six bytes, five of which bytes are data to be transmitted and one of which bytes is not tranmitted but is used to calculate the CRC. The non-transmitted byte is the site identification 342 byte and the bit setting, i.e., color, for that one byte is determined by the site radio repeater to which the mobile unit is currently logged. Since the site identification byte is used to calculate the CRC value that is transmitted is dependent on the non-transmitted site identification byte.

To calculate the same CRC value included with the transmission, the site radio repeater 330 must apply a site identification byte having the same bit setting as does the site identification byte that was used to calculate the CRC value in the mobile radio repeater.

If the site radio repeater does not apply the proper site identification byte bit setting (color) to calculate the same CRC value as was transmitted with the data, then the radio repeater 300 detects a conflict between the calculated and received CRC values, and discards the transmission as being corrupted and uncorrectable. Since the site identification bit setting is never acutally transmitted (other than with the original site identification message), no transmission corruption can interfer with the site identification bit setting. If the message fails to decode on the first attempt, the site radio repeater 330 may be programmed to try a second time to decode applying a default site ID bit setting. If the mobile unit does not have site identification capability and instead has applied a default setting, e.g. all 0's, for the non-transmitted site ID byte, then the site radio repeater 330 will have to apply the default setting to decode the transmission.

Similarly, the identification byte may also be used to identify the type of transmission, such as a data or control message transmission in addition or alternative to identifying the site. In this regard, one bit setting (or group of bit settings) of the site ID byte 342 may be used to designate a data mode transmission and another bit setting or group of bit settings may be used to designate another type of transmission, such as voice or a control message, steps 372 and 374. The site radio repeater 330 receives the transmission expecting it to be a particular mode of transmission, e.g., data or voice modes, and decodes the transmission with the color bit setting corresponding to the expected type of transmission, steps 376 and 378. In this way, the site radio repeater will not erroneously decode, for example, a data mode transmission as a control message transmission.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for communicating digital signals between a radio frequency (RF) mobile radio unit and an RF base station site having a controller comprising:

(a) packaging digital information to be transmitted from the mobile radio units in a series of bytes;

(b) assembling a predetermined number of the series of bytes from step (a) for transmission;

(c) calculating an error detection value dependent upon the bytes assembled in step (b) and at least one non-transmitted identification byte having a first predetermined bit setting, where said bit setting is relatively unique, and where the at least one non-transmitted identification byte is defined by data previously received by the mobile radio unit from an assigned base station site;

(d) transmitting the bytes assembled in step (b) with the error detection value calculated in step (c) from the mobile radio unit and reception of the transmission by an RF base station site;

(e) calculating in the base station site controller an error detection value from the bytes received in step (d) and from at least one identification byte stored in the site controller, where the at least one identification byte stored in the site controller for the assigned base station site corresponds to the at least one non-transmitted identification byte defined by the data previously received by the mobile radio;

(f) comparing in the base station site controller the error detection value calculated in step (e) to the error detection value received in step (d);

(g) decoding the bytes received in step (d) if the comparison in step (f) matches the two error detection values;

(h) discarding the bytes received in step (d) if the comparison in step (f) does not match the two error detection values, and (j) prior to step (a), the mobile radio unit receives information identifying the non-transmitted byte from a base station site in conjunction with assigning the mobile radio to the site.

2. A method for communicating digital signals as in claim 1 wherein in step (c) the calculation of an error detection valve is a cyclic redundancy check code (CRC).

3. A method for communicating digital signals as in claim 1 wherein in step (c) the non-transmitted identification byte having a first predetermined bit setting is selected from a group of bit setting each of which bit settings is all zero bits except for a single 1 bit.

4. A method for communicating digital signals between a radio frequency (RF) radio unit and an RF repeater site having a controller comprising:

(a) packaging digital information to be transmitted from the radio units in a series of bytes;

(b) assembling a predetermined number of the series of bytes from step (a) for transmission;

(c) calculating an error detection value dependent upon the bytes assembled in step (b) and a non-transmitted identification byte having a first predetermined bit setting, where said bit setting is relatively unique;

(d) transmitting the bytes assembled in step (b) with the error detection value calculated in step (c) from the radio unit and reception of the transmission by RF repeater site;

(e) calculating in the repeater site controller an error detection value from the bytes received in step (d) and from an identification byte stored in the site controller;

(f) comparing in the repeater site controller the error detection value calculated in step (e) to the error detection value received in step (d);

(g) decoding the bytes received in step (d) if the comparison in step (f) matches the two error detection values;

(h) discarding the bytes received in step (d) if the comparison in step (f) does not match the two error detection values, and wherein before step (a) the following steps are performed:

(i) the radio unit receives a site identification message from the repeater site in conjunction with the unit logging into the site, which message defines the non-transmitted identification bit setting applied in step (c), (j) the radio unit temporarily stores the non-transmitted bit setting as the non-transmitted identification bit setting applied in step (c).

5. A method for communicating digital signals between a radio frequency (RF) radio unit and an RF repeater site having a controller comprising:

(a) packaging digital information to be transmitted from the radio units in a series of bytes;

(b) assembling a predetermined number of the series of bytes from step (a) for transmission;

(c) calculating an error detection value dependent upon the bytes assembled in step (b) and a non-transmitted identification byte having a first predetermined bit setting, where said bit setting is relatively unique;

(d) transmitting the bytes assembled in step (b) with the error detection value calculated in step (c) from the radio unit and reception of the transmission by RF repeater site;

(e) calculating in the repeater site controller an error detection value from the bytes received in step (d) and from an identification byte stored in the site controller;

(f) comparing in the repeater site controller the error detection value calculated in step (e) to the error detection value received in step (d);

(g) decoding the bytes received in step (d) if the comparison in step (f) matches the two error detection values;

(h) discarding the bytes received in step (d) if the comparison in step (f) does not match the two error detection values, and wherein before step (a) the following steps are performed:

(k) the radio unit latches onto a working channel of the RF repeater site as the unit enters a broadcast coverage area of the RF repeater site;

(l) the radio unit receives on the working channel a site identification message from the repeater site, which message defines the non-transmitted identification bit setting applied in step (c), and (m) the radio unit temporarily stores the non-transmitted identification bit setting as the non-transmitted identification bit setting applied in step (c).

6. A method for communicating digital signals between a radio frequency (RF) radio unit and a multisite radio system having at least a first and second RF repeater site, where each site has a controller and the sites are interconnected by a switch, the method comprises the following steps:

(a) the radio unit when logged into the first RF repeater site controller stores in a temporary memory of the radio unit a non-transmitted identification byte having a first predetermined bit setting where said bit setting is relatively unique to the first RF repeater site;

(b) the radio unit packages digital information to be transmitted from the radio units in a series of bytes to the first RF repeater site;

(c) the radio unit assembles a predetermined number of the series of bytes from step (b) for transmission to the first RF repeater site;

(d) calculating an error detection value dependent upon the bytes assembled in step (c) and the non-transmitted identification byte;

(e) transmitting the bytes assembled in step (c) with the error detection value calculated in step (d) from the radio unit and reception of the transmission by first RF repeater site;

(f) calculating in the site controller an error detection value from the bytes received in step (e) and from an identification byte stored in the first RF repeater site controller;

(g) comparing in the first RF repeater site controller the error detection value calculated in step (f) to the error detection value received in step (e);

(h) decoding the bytes received in step (e) if the comparison in step (g) matches the two error detection values;

(i) discarding the bytes received in step (e) if the comparison in step (f) does not match the two error detection values, (j) the radio unit when logged into the first RF repeater site moves away from the first RF repeater site, and looses adequate reception of a working channel broadcast from the first RF repeater site and begins scanning for a working channel;

(k) the radio unit latches onto a working channel of the second RF repeater site as the unit enters a broadcast coverage area of the second RF repeater site; and (l) the radio unit receives on the working channel a site identification message from the second RF repeater site, which message defines a second non-transmitted identification bit setting relatively unique to the second RF repeater site.

7. A method for communicating digital signals between a radio frequency (RF) radio unit and an RF repeater site having a controller comprising:

(a) packaging digital data information to be transmitted from the radio units in a series of data bytes to be transmitted from the radio unit to the RF repeater site;

(b) setting a first transceiver in the RF repeater site to a data mode and a second transceiver in the RF repeater site to a voice mode;

(c) assembling into a signal data package a predetermined number of the data bytes;

(d) calculating a first error detection value dependent upon the data bytes assembled in step (c), and a first non-transmitted data identification byte;

(e) transmitting from the radio unit the data bytes assembled in step (c) with the error detection value calculated in step (d);

(f) calculating in the repeater site controller an error detection value using the data bytes received by the first transceiver and a data identification byte stored in the site controller;

(g) comparing in the repeater site controller the error detection value calculated in step (f) to the error detection value from step (e), and (h) decoding the data bytes received by the transceiver in data mode, if the comparison in step (g) matches the two error detection values;

(i) calculating in the repeater site controller an error detection value using the data bytes received by the second transceiver set to voice mode and a voice identification byte store in the site controller;

(j) comparing in the repeater site controller the error detection value calculated in step (i) to the error detection value received by the second transceiver, and (k) discarding the bytes received by the second transceiver if the comparison in step (j) does not match the two error detection values.

8. A method for communicating digital signals as in claim 7 wherein the calculations of an error detection valve is a cyclic redundancy check code (CRC).

* * * * *